(No Model.)

H. LEONARD.
POURING SPOUT FOR MILK PAILS.

No. 272,714. Patented Feb. 20, 1883.

Witnesses
E. B. Stocking

Inventor:
H. Leonard
By
Atty.

UNITED STATES PATENT OFFICE.

HENRY LEONARD, OF CAMBRIDGE, VERMONT.

POURING-SPOUT FOR MILK-PAILS.

SPECIFICATION forming part of Letters Patent No. 272,714, dated February 20, 1883.

Application filed June 2, 1882. (No model.)

*To all whom it may concern:*

Be it known that I, HENRY LEONARD, a citizen of the United States of America, residing at Cambridge, in the county of Lamoille and State of Vermont, have invented certain new and useful Improvements in Pouring-Spouts for Milk-Pails; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to strainers and pouring-spouts for milk-pails; and it consists in certain features hereinafter described, and specifically set forth in the claim.

Figure 1:
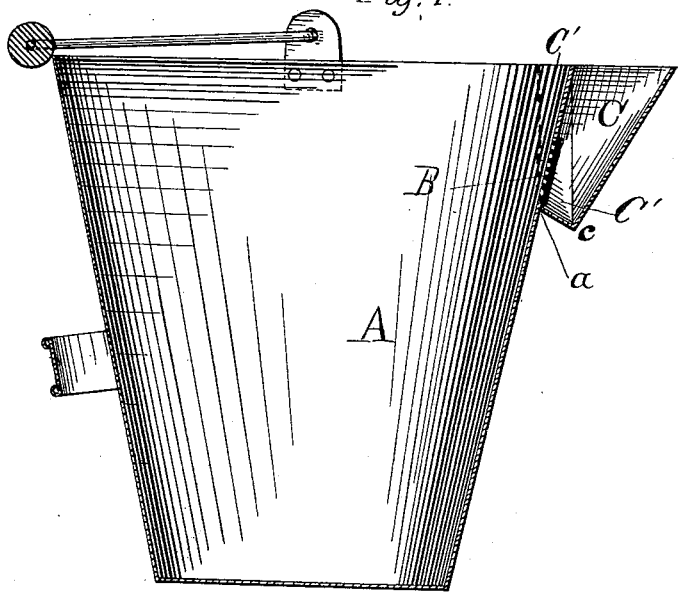
Figure 2:
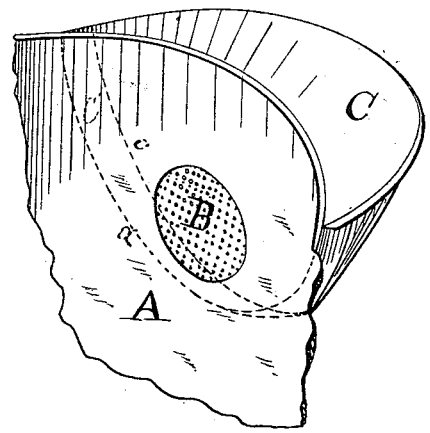

Figure 1 is a vertical central section of an ordinary flaring tin pail provided with a strainer and spout constructed in accordance with my invention, and Fig. 2 is a perspective of said strainer and spout secured to a portion of a pail.

Like letters refer to like parts in both figures.

A represents the body of the pail, to which are secured in any usual well known manner the strainer B and the pouring-spout C C'. The latter, instead of extending in a slanted line upward and outward from the line a, at which it is secured to the pail, as in the usual construction, extends downward and outward to the point c, and from thence upward and outward, as clearly shown in Fig. 1.

In order to construct a pouring-spout of ordinary metal or tin, I have found it necessary to make use of two pieces, the larger piece, C, being shaped similar to the ordinary spout, while the small piece, C', of the spout consists of a straight band of metal with parallel sides, which is soldered or otherwise attached to the spout C on one side and to the pail A on the other. Being thus secured to the inclined side of the pail, this band will project downward from the body of pail.

By this construction a pail provided with my improvement is more easily kept cleanly, from the fact that after pouring milk therefrom and while the pail is in an upright position the milk left in the spout or adhering to it settles in the depression c, where it is readily accessible in the operation of cleaning the spout, whereas in the construction commonly used the milk and sediment settle down against the body of the pail along the line a, which is a sharp angle and difficult of access for cleaning purposes.

I am aware that milk-pails have been provided with spouts having a bottom extending outward from the body of the pail, and I do not claim such, broadly, as my invention.

Having described my invention, what I claim as new, and desire to secure by Letters Patent, is—

In combination with a milk-pail provided with a strainer, the curved spout C, having attached thereto and to the milk-pail a band or strip, C', substantially as described, and for the purpose set forth.

In testimony whereof I affix my signature in presence of two witnesses.

HENRY LEONARD.

Witnesses:
 MARION L. GRISWOLD,
 JOHN B. PAGE.